(12) United States Patent
Saitoh et al.

(10) Patent No.: US 8,422,807 B2
(45) Date of Patent: Apr. 16, 2013

(54) ENCODER AND IMAGE CONVERSION APPARATUS

(75) Inventors: Makoto Saitoh, Osaka (JP); Yuki Haraguchi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 142 days.

(21) Appl. No.: 12/967,790

(22) Filed: Dec. 14, 2010

(65) Prior Publication Data

US 2011/0150350 A1   Jun. 23, 2011

(30) Foreign Application Priority Data

Dec. 17, 2009   (JP) ................. 2009-286804

(51) Int. Cl.
  *G06K 9/00* (2006.01)
(52) U.S. Cl.
  USPC ............ 382/238; 382/239; 382/233; 375/240
(58) Field of Classification Search .................. 382/233, 382/238, 239; 375/240
  See application file for complete search history.

(56) References Cited

U.S. PATENT DOCUMENTS

| | | | | |
|---|---|---|---|---|
| 5,073,820 A | * | 12/1991 | Nakagawa et al. | 375/240.03 |
| 5,291,282 A | * | 3/1994 | Nakagawa et al. | 375/240.23 |
| 5,907,636 A | * | 5/1999 | Nakahara | 382/233 |
| 6,026,356 A | * | 2/2000 | Yue et al. | 704/201 |
| 6,687,412 B1 | * | 2/2004 | Rao et al. | 382/251 |
| 6,915,018 B2 | * | 7/2005 | Tajime | 382/251 |
| 6,990,243 B1 | * | 1/2006 | Kuniba et al. | 382/239 |
| 7,899,261 B2 | * | 3/2011 | Takahashi | 382/239 |
| 2006/0133479 A1 | * | 6/2006 | Chen et al. | 375/240.03 |
| 2007/0217507 A1 | * | 9/2007 | Kazui et al. | 375/240.03 |
| 2009/0041122 A1 | * | 2/2009 | Kodama et al. | 375/240.12 |
| 2011/0032988 A1 | * | 2/2011 | Chiba et al. | 375/240.12 |

FOREIGN PATENT DOCUMENTS

| | | |
|---|---|---|
| JP | 2000-78589 | 3/2000 |
| JP | 2004-241957 | 8/2004 |

* cited by examiner

*Primary Examiner* — Stephen R Koziol
*Assistant Examiner* — Shaghayegh Azima
(74) *Attorney, Agent, or Firm* — Oblon, Spivak, McClelland, Maier & Neustadt, L.L.P.

(57) ABSTRACT

It is an object to provide a method of calculating a coding cost by which the magnitude relation of the amounts of generated codes can be estimated with high accuracy. A cost calculation part generates a differential block between a coding object block and a prediction block. Hadamard Transform is performed on the differential block to generate a frequency component block. A conversion factor matrix is generated with the information of a quantization matrix reflected thereon. A coding cost is calculated by multiplying components in the frequency component block individually by components in the conversion factor matrix and adding up the multiplied components. A mode selection part selects an optimum predictive coding method on the basis of the coding cost.

6 Claims, 3 Drawing Sheets

ENCODER AND IMAGE CONVERSION APPARATUS

BACKGROUND OF THE INVENTION

1. Field of the Invention

The present invention relates to a coding technique, and more particularly to a technique for performing coding by selecting an optimum one out of many types of predictive coding processes.

2. Description of the Background Art

An encoder compressively encodes uncompressed image data such as YCbCr or the like to output stream data. In order to compresses the image data, the encoder selects an optimum one out of various types of predictive coding processes. For intra-frame prediction, the encoder selects an optimum one out of a plurality of prediction modes. For inter-frame prediction, the encoder selects an optimum motion compensation block. Alternatively, the encoder selects which of the intra-frame prediction and the inter-frame prediction should be used.

In order to select a prediction mode in the intra-frame prediction or select a motion compensation block in the inter-frame prediction, conventionally, an evaluation value, i.e., SATD (sum of absolute transformed difference) has been used. The encoder uses a value of the SATD as a cost of coding.

Specifically, the encoder calculates a differential block from the difference between a coding object block and a prediction block. The encoder carries out frequency conversion of the differential block by performing Hadamard Transform on the differential block in vertical and horizontal directions. The encoder obtains the SATD by computing a sum of absolute values of frequency components in the frequency-converted differential block.

The encoder calculates the SATDs for all the prediction modes or all the motion compensation blocks to obtain coding costs for all the predictive coding processes. By selecting one of the predictive coding processes, of which the coding cost is minimum, the encoder can select a process in which less amount of codes are generated and thereby improve the coding efficiency.

In the H.264/AVC standard, in order to quantize a signal of orthogonally transformed frequency component, a quantization matrix is used. In other words, respective signals of frequency components are quantized with different quantization step values. For this reason, the proportional relation between the coding cost calculated by using the SATD and the amount of generated codes is broken. There arises a problem that an optimum predictive coding process by which the amount of generated codes becomes minimum cannot be selected by using the SATD. Not optimum allocation of the amount of generated codes in a stream may sometimes cause degradation of image quality.

Japanese Patent Application Laid Open Gazette No. 2000-078589 discloses a technique for reducing the amount of computation required for the calculation of the coding cost. In Japanese Patent Application Laid Open Gazette No. 2000-078589, a coding object block and a reference block are orthogonally transformed individually. Respective sums of absolute differences (SADs) are obtained by using only signals in a low frequency domain out of frequency components in these orthogonally transformed blocks. The calculated sums of absolute differences (SADs) are compared with each other, and a predictive coding process with less amount of generated codes is thereby selected.

Japanese Patent Application Laid Open Gazette No. 2004-241957 also discloses a technique for reducing the amount of computation required for the calculation of the coding cost. In Japanese Patent Application Laid Open Gazette No. 2004-241957, the coding cost is calculated by performing orthogonal transform so that only specific frequency components can be left.

Both Japanese Patent Application Laid Open Gazette Nos. 2000-078589 and 2004-241957 disclose a method of calculating the coding cost for limited specific frequency components. Though the amount of computation can be reduced by using the techniques disclosed in the above documents, there arises a problem of causing a reduction in the accuracy of computation of the coding cost.

SUMMARY OF THE INVENTION

The present invention is intended for an encoder. According to an aspect of the present invention, the encoder comprises a difference calculation part for calculating a differential block between a coding object block and a prediction block for each of a plurality of patterns of predictive coding processes, a frequency component calculation part for orthogonally transforming the differential block to calculate a frequency component block, a factor multiplication part for multiplying each of frequency components in the frequency component block by a conversion factor on which the magnitude relation of quantization steps is reflected, a cost calculation part for adding up said frequency components in the frequency component block, each of which is multiplied by the conversion factor, to obtain a coding cost, and a selection part for selecting a predictive coding process for which the coding cost is minimum.

By using the encoder of the present invention, the coding cost can be calculated with the information of a quantization matrix reflected thereon. It is thereby possible to maintain the proportional relation between the coding cost and the amount of generated codes and select an optimum predictive coding process. By selecting an optimum predictive coding process for each coding object block, the coding assignment for each picture is optimized and the image quality can be thereby improved.

It is an object of the present invention to provide a technique for improving the accuracy of computation of the coding cost and selecting an optimum predictive coding process.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
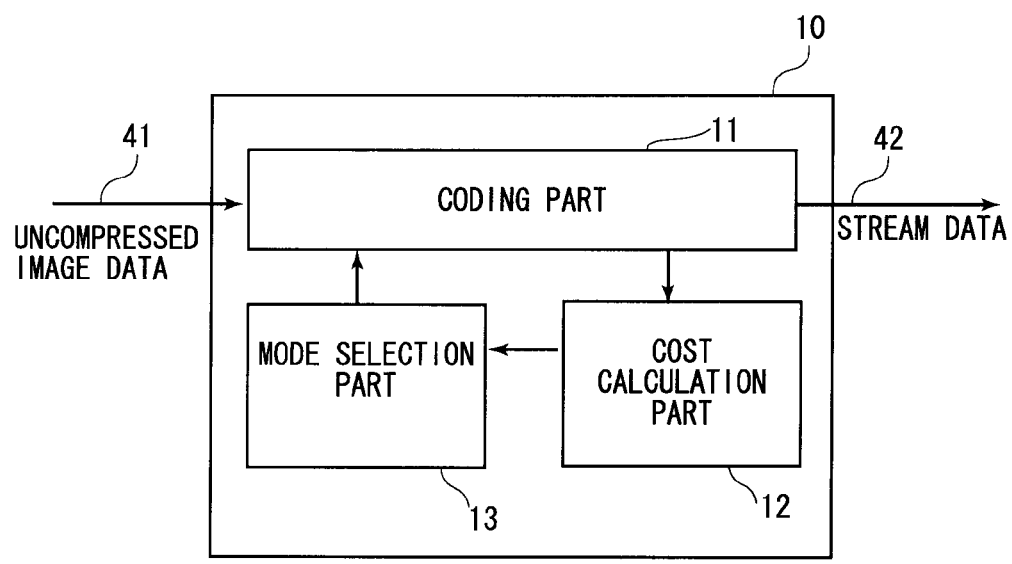
FIG. 1 is a block diagram showing an encoder in accordance with a preferred embodiment of the present invention.

Hereinafter, with reference to figures, the preferred embodiment of the present invention will be discussed. FIG.

1 is a block diagram showing an encoder 10 in accordance with the present preferred embodiment. The encoder 10 comprises a coding part 11, a cost calculation part 12, and a mode selection part 13.

The coding part 11 inputs uncompressed image data 41 therein. The uncompressed image data 41 is, for example, image data in the YCbCr space. The coding part 11 performs compressive coding on the uncompressed image data 41 to output stream data 42. The coding part 11 outputs the stream data 42 coded in, for example, the H.264/AVC coding system.

In order to perform the compressive coding, the coding part 11 uses various predictive coding process. For I picture (Intra Picture), the coding part 11 performs intra-frame prediction (intra prediction) to carry out the compressive coding.

For P picture (Predictive Picture), the coding part 11 performs forward predictive coding. Specifically, the coding part 11 performs inter-frame prediction (inter prediction) using a past reference image to carry out the compressive coding.

For B picture (Bi-direction Predictive Picture), the coding part 11 performs bidirectional predictive coding. Specifically, the coding part 11 performs inter-frame prediction (inter prediction) using past and future reference images to carry out the compressive coding.

The coding part 11 has a plurality of prediction modes for the intra prediction. In the H.264/AVC standard, for the intra prediction of a 4×4 block, the coding part 11 has nine prediction modes Prediction Mode 0 to Prediction Mode 8. In the H.264/AVC standard, for the intra prediction of a 16×16 block, the coding part 11 has four prediction modes Prediction Mode 0 to Prediction Mode 3.

The cost calculation part 12 calculates a coding cost for each of the plurality of prediction modes. The coding cost refers to an evaluation value used for estimating the magnitude relation of the amounts of generated codes. The method of calculating the coding cost will be discussed later in detail.

The mode selection part 13 compares the coding costs for those prediction modes, which are calculated by the cost calculation part 12, and selects a prediction mode for which the coding cost is minimum. The coding part 11 performs the intra prediction coding in accordance with the prediction mode selected by the mode selection part 13.

In order to perform the inter prediction, the coding part 11 switches and uses a plurality of block sizes as a motion compensation block. In the H.264/AVC standard, prepared are seven types of motion compensation blocks ranging from a 16×16 block to a 4×4 block. The coding part 11 obtains a reference picture and a motion vector for the selected motion compensation block and performs the compressive coding on the basis of the inter prediction.

The cost calculation part 12 selects a combination of the reference picture and the motion vector for each of the plurality of motion compensation blocks and calculates the coding cost for the compressive coding. The method of calculating the coding cost will be discussed later in detail.

The mode selection part 13 compares the respective coding costs calculated by the cost calculation part 12 for the combinations of the motion compensation block, the reference picture and the motion vector and selects a combination for which the coding cost is minimum. The coding part 11 performs the inter prediction coding in accordance with the combination of the motion compensation block, the reference picture and the motion vector selected by the mode selection part 13.

As the size of the motion compensation block becomes smaller, finer prediction can be performed. On the other hand, as the size of the motion compensation block becomes smaller, information on the motion vector increases. Therefore, by the calculation of the coding cost, the amount of information is overall evaluated and an optimum predictive coding process can be thereby selected.

Figure 2:
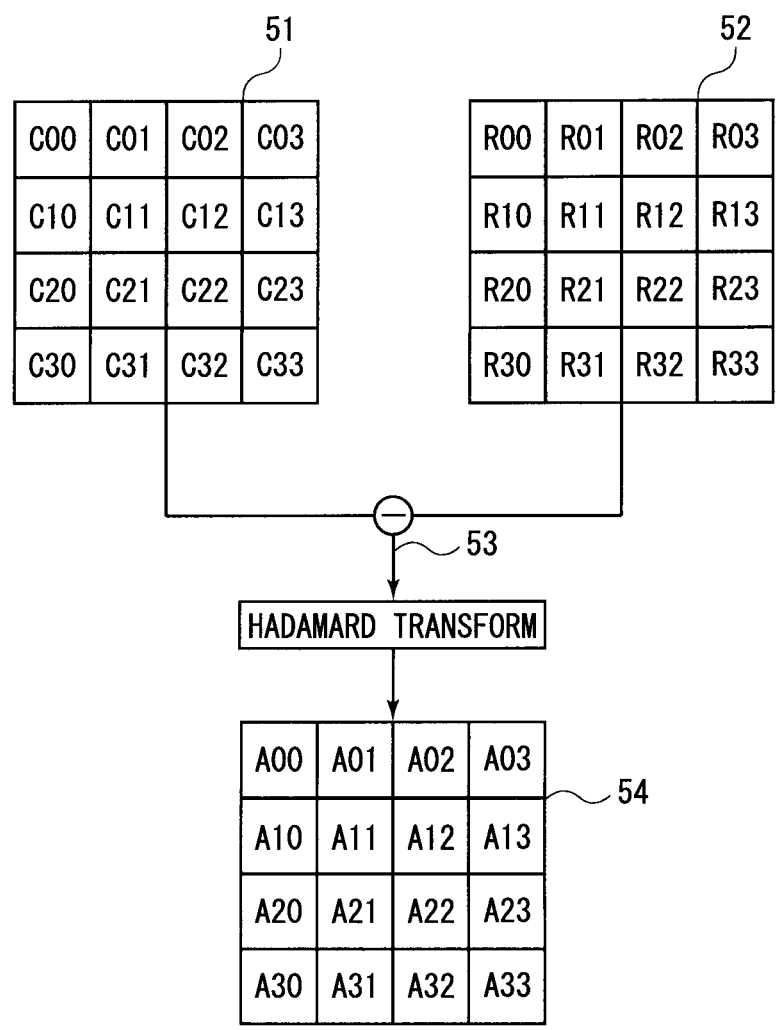
FIG. 2 is a view showing a process for generating a frequency component block.

FIG. 2 is a view showing a process for generating a frequency component block 54. In FIG. 2, a coding object block 51 is a pixel matrix in a space domain. As shown in FIG. 2, the coding object block 51 is a 4×4 pixel block. Components C00 to C33 represent respective pixel values of pixels in the 4×4 pixel block.

In FIG. 2, a prediction block 52 is a pixel matrix in a space domain. As shown in FIG. 2, the prediction block 52 is a 4×4 pixel block. Components R00 to R33 represent respective pixel values of pixels in the 4×4 pixel block.

In the intra prediction, the prediction block 52 is a pixel block obtained by prediction from surrounding pixels in the same frame as the coding object block 51 is included in. As discussed above, in the H.264/AVC standard, the prediction block is generated from the surrounding pixels by using the nine prediction modes.

In the inter prediction, the prediction block 52 is a pixel block in a past or future picture (frame) which is different from the picture (frame) including the coding object block 51.

FIG. 2 shows a 4×4 pixel block, for simple illustration. As discussed above, in the H.264/AVC standard, prepared are seven types of motion compensation blocks ranging from a 16×16 block to a 4×4 block. Respective sizes of the coding object block 51 and the prediction block 52 are changed in accordance with the size of the motion compensation block.

As shown in FIG. 2, the cost calculation part 12 calculates the difference between the coding object block 51 and the prediction block 52 to obtain a differential block 53. The differential block 53 is a block image having pixels each of which has a value obtained as a difference value between the pixel value of a corresponding coordinate position in the coding object block 51 and the pixel value of a corresponding coordinate position in the prediction block 52. In other words, the differential block 53 is a block image having pixel values each of which is the pixel difference value in the same coordinate position of the coding object block 51 and the prediction block 52.

As shown in FIG. 2, the cost calculation part 12 performs Hadamard Transform on the differential block 53 to generate a frequency component block 54. The frequency component block 54 is a matrix in a frequency domain. The frequency component block 54 has sixteen frequency components A00 to A33. The frequency component A00 is a DC component. The frequency components A01 to A33 other than the frequency component A00 are AC components. As the index (01 to 33) of the frequency components A01 to A33 increases, the frequency component has a higher frequency.

Figure 3:
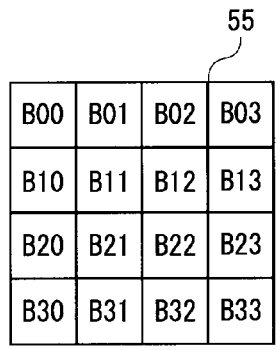
FIG. 3 is a view showing a quantization matrix.

FIG. 3 is a view showing a quantization matrix 55. The quantization matrix 55 is a matrix in a frequency domain. The quantization matrix 55 has sixteen correction factors B00 to B33. The correction factor B00 is a correction factor for the DC component. The correction factors B01 to B33 other than the correction factor B00 are correction factors for the AC components. As the index (01 to 33) of the correction factors B01 to B33 increases, the correction factor is used for a higher frequency component.

In the H.264/AVC standard, in order to quantize a coded image, a quantization matrix is used. A quantization step is corrected by multiplying the quantization step by the quantization matrix. Quantization of a coded image is performed by using the corrected quantization step.

Figure 4:
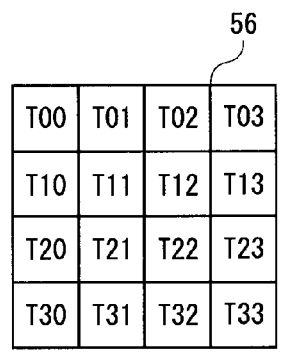
FIG. 4 is a view showing a conversion factor matrix.

FIG. 4 is a view showing a conversion factor matrix 56. The cost calculation part 12 generates the conversion factor matrix 56 by using the quantization matrix 55. The conversion factor matrix 56 is a matrix in a frequency domain. The conversion factor matrix 56 has sixteen conversion factors T00 to T33. The conversion factor T00 is a conversion factor for the DC component. The conversion factors T01 to T33 other than the conversion factor T00 are conversion factors for the AC components. As the index (01 to 33) of the conversion factors T01 to T33 increases, the conversion factor is used for a higher frequency component.

Eq. (1) is an arithmetic expression used for calculating the conversion factors T00 to T33 in the conversion factor matrix 56.

$$\begin{cases} T00 = 1.00 \\ T01 = B00/B01 \\ T02 = B00/B02 \\ T03 = B00/B03 \\ \vdots \\ T32 = B00/B32 \\ T33 = B00/B33 \end{cases} \quad (1)$$

As expressed by Eq. (1), "1.00" is set to the conversion factor T00 for the DC component. In other words, no conversion is performed on the DC component.

As expressed by Eq. (1), the conversion factor T01 is a value obtained by dividing the correction factor B00 for the DC component by the correction factor B01 for the AC component. The conversion factor T02 is a value obtained by dividing the correction factor B00 for the DC component by the correction factor B02 for the AC component. As to the following conversion factors, similarly, the conversion factor for each frequency component is a ratio of the correction factor for the DC component to the correction factor for the corresponding frequency component. The same also applies to the conversion factor T00, which is a ratio B00/B00=1.00.

The conversion factors for the AC components each take a value smaller than 1.0 due to the ratio of the correction factors. Specifically, since the correction factor for the AC component is larger than that for the DC component, The conversion factors T01 to T33 each take a value smaller than 1.0. Therefore, the conversion factor needs several decimal digits accuracy.

As the frequency becomes higher, normally, the correction factors B00 to B33 in the quantization matrix 55 have larger values. Therefore, as the frequency becomes higher, the conversion factors T00 to T33 in the conversion factor matrix 56 have smaller values. More specifically, a smaller correction factor is set for a more important frequency component, and a larger correction factor is set for a frequency component which less affects the image quality even if some information is dropped out. Therefore, a larger conversion factor is set for a more important frequency component, and a smaller correction factor is set for a frequency component which less affects the image quality even if some information is dropped out.

The cost calculation part 12 calculates the coding cost by applying the conversion factor matrix 56 shown in FIG. 4 to the frequency component block 54 shown in FIG. 2. Eq. (2) is an arithmetic expression representing a method of calculating the coding cost (COST).

$$\text{COST}=(A00*T00)+(A01*T00)+(A02*T02)+\ldots+(A32*T32)+(A33*T33) \quad (2)$$

As expressed by Eq. (2), the cost calculation part 12 calculates the coding cost (COST) by multiplying each of the frequency components in the frequency component block 54 by the conversion factor for the corresponding frequency component in the conversion factor matrix 56 and adding up the products. Specifically, the cost calculation part 12 calculates the coding cost by adding up the products each obtained by multiplying respective values for the same frequency component in the frequency component block 54 and the conversion factor matrix 56 by each other.

Thus, the cost calculation part 12 does not calculate the coding cost by directly evaluating the frequency components in the frequency component block 54. In other words, the cost calculation part 12 does not use the same SATD as has been used conventionally. The cost calculation part 12 calculates the coding cost by using the frequency components in the frequency component block 54 which are converted with the corresponding conversion factors. By multiplying each frequency component by the corresponding conversion factor, the information of the quantization matrix is reflected on the coding cost.

The cost calculation part 12 calculates the coding costs for all the predictive coding processes. The cost calculation part 12 calculates the coding costs for all the prediction modes in the intra prediction. The cost calculation part 12 calculates the coding costs for all the combinations of the motion compensation block, the reference picture, and the motion vector in the inter prediction.

The mode selection part 13 selects a process to be actually used for coding, from the coding costs for all the predictive coding processes, which are calculated by the cost calculation part 12. The mode selection part 13 notifies the coding part 11 of the selected predictive coding process. The coding part 11 performs the intra prediction coding or the inter prediction coding in accordance with the process selected by the mode selection part 13. Also as to P picture or B picture, depending on the block, the intra prediction coding is sometimes performed. The mode selection part 13 also selects which of the intra prediction coding and the inter prediction coding should be performed, from all the calculated coding costs.

The coding part 11 performs compressive coding to output the stream data 42. As discussed above, the stream data 42 is stream data compressed, for example, in the H.264/AVC standard coding system.

Thus, in the encoder 10 of the present preferred embodiment, the coding cost is calculated by using the conversion factor matrix 56 reflecting the information of the quantization matrix 55. Since the coding part 11 actually performs coding by using the quantization matrix, the coding cost can be used as an evaluation value approximating to the magnitude relation of the amounts of actually generated codes. With the coding cost, the magnitude relation of the amounts of generated codes can be estimated with high accuracy. The proportional relation between the amount of generated codes and the coding cost is thereby maintained, and it is therefore possible to select an optimum predictive coding process and reduce the amount of generated codes. Further, an optimum amount of generated codes is assigned to each picture and this ensures improvement of the image quality.

In the above-discussed preferred embodiment, as expressed by Eq. (1), the ratio of the DC component to each frequency component in the quantization matrix 55 is used as the conversion factor. As a variation, weighting may be given to each frequency component. Eq. (3) is an arithmetic expression used for obtaining the conversion factor by giving weighting to each frequency component.

$$\begin{cases} T00 = 1.00*1.50 \\ T01 = (B00/B01)*1.40 \\ T02 = (B00/B02)*1.30 \\ \vdots \\ T32 = (B00/B32)*1.0 \\ T33 = (B00/B33)*0.9 \end{cases} \quad (3)$$

In Eq. (3), the DC component is multiplied by a weighting factor of 1.50. Among the AC components, the component of B00/B01 is multiplied by a weighting factor of 1.40 and the component of B00/B02 is multiplied by a weighting factor of 1.30. Thus, as the frequency becomes higher, the weighting factor decreases. The final component of B00/B33 is multiplied by a weighting factor of 0.9.

Thus, by calculating the conversion factor with weighting given thereto, an optimum coding cost in accordance with the content of the image can be calculated, as well as with the information of the quantization matrix reflected thereon. For example, weighting may be adjusted in accordance with the scene of the image.

Though the conversion factor is calculated from the value obtained by dividing the correction factor for the DC component in the quantization matrix 55 by the correction factor for each frequency component in the above-discussed preferred embodiment, this conversion factor is only one example. Other methods may be used to obtain the conversion factor only if each frequency component in the quantization matrix 55 is reflected on the calculated conversion factor and the calculated conversion factor has a relation approximating the magnitude relation of the coding costs to the magnitude relation of the amounts of generated codes. It is preferable that the conversion factor should be calculated so that the proportional relation between the amount of generated codes and the coding cost can be maintained.

In the above-discussed preferred embodiment, the quantization matrix 55 is used in common for an intra block (a block on which the intra prediction is performed) and an inter block (a block on which the inter prediction is performed) without distinction. Different quantization matrices may be used, however, for the intra block and the inter block. In this case, respective conversion factors for these blocks are individually calculated and different conversion factor matrices are used. Further, a plurality of quantization matrices may be used depending on the block size.

In the case of using a plurality of quantization matrices, DC components of these quantization matrices are sometimes different from one another. If the conversion factors are individually obtained by using Eq. (1) and the costs are individually calculated by using Eq. (2), the difference of the DC components significantly affects the costs. In order to reduce the effect of the difference of the DC components on the costs, weighting may be given to suppress the difference. With reference to Eq. (3), discussion has been made on the exemplary method of calculating the conversion factors with weighting given thereto. By the same method as the above, weighting may be given so as to absorb the difference of the DC components. Alternatively, even when a plurality of quantization matrices are used, in the calculation of the conversion factors, a common DC component may be used. For example, the minimum value out of the plurality of DC components may be used as a common DC component.

Figure 5:
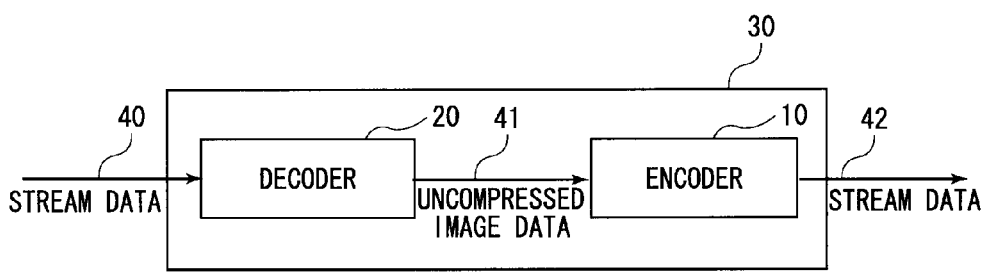
FIG. 5 is a block diagram showing a transcoder in accordance with the preferred embodiment of the present invention.

FIG. 5 is a block diagram showing a transcoder 30 to which the encoder 10 of the present preferred embodiment is applied. The transcoder 30 comprises a decoder 20 and the encoder 10. The transcoder 30 inputs stream data 40 therein from the outside. The stream data 40 is stream data compressed in a coding system such as MPEG4. The decoder 20 extends the stream data 40 to output uncompressed image data 41. The uncompressed image data 41 is, for example, image data such as YCbCr. The encoder 10 inputs the uncompressed image data 41 therein and performs the same processing as that in the above-discussed preferred embodiment, to thereby output stream data 42. The stream data 42 is stream data coded in, for example, the H.264/AVC coding system.

Thus, the transcoder 30 converts the stream data 40 in, for example, MPEG4 into stream data in H.264 and outputs the converted stream data. In this case, the encoder 10 calculates the coding cost by using the conversion factor matrix 56 reflecting the information of the quantization matrix 55, as discussed above. The amount of generated codes in the encoding-converted stream data 42 can be thereby reduced. Further, the image quality of the encoding-converted stream data 42 can be improved.

The encoder 10 of the present preferred embodiment may be applied to a translator. Specifically, the encoder 10 of the present preferred embodiment may be applied to, for example, a translator which once decodes stream data in H.264 and encodes the decoded data into the stream data in H.264 again. Also in this case, the encoder 10 calculates the coding cost by using the conversion factor matrix 56 reflecting the information of the quantization matrix, as discussed above.

While the invention has been shown and described in detail, the foregoing description is in all aspects illustrative and not restrictive. It is therefore understood that numerous modifications and variations can be devised without departing from the scope of the invention.

What is claimed is:

1. An encoder, comprising:
at least one processing circuit configured to implement
    a difference calculator configured to calculate a differential block between a coding object block and a prediction block for each of a plurality of patterns of predictive coding processes;
    a frequency component calculator configured to, for each differential block of the plurality of patterns of predictive coding processes, orthogonally transform said respective differential block to calculate a frequency component block;
    a factor multiplier configured to, for each frequency component block of the plurality of patterns of predictive coding processes, multiply each frequency component in said respective frequency component block by a corresponding conversion factor included in a conversion factor matrix corresponding to the respective one of the plurality of patterns of predictive coding processes on which a magnitude relation of quantization steps is reflected, the corresponding conversion factor matrix being calculated from, and different from, a quantization matrix used to perform coding by the respective one of the predictive coding processes;
    a cost calculator configured to, for each frequency component block of the plurality of patterns of predictive coding processes, add up said frequency components in said respective frequency component block, each of which is multiplied by said corresponding conversion factor, to obtain a coding cost; and a selector configured to select the one of the predictive coding processes for which said coding cost is minimum, wherein said factor multiplier is configured to, for each frequency component block of the plurality patterns of predictive coding processes, use a value calculated on the basis of a relation between a correction factor set for each frequency component in said quantization matrix and a correction factor set for a DC component in said quantization matrix, as said conversion factors.

2. The encoder according to claim 1, wherein
said factor multiplier is configured to, for each frequency component block of the plurality of patterns of predictive coding processes, use a ratio of said correction factor set for said DC component in said quantization matrix to said correction factor set for said each of said frequency components in said quantization matrix, as said conversion factors.

3. The encoder according to claim 1, wherein
different matrices are used as said quantization matrix in accordance with the block types of coding objects.

4. The encoder according to claim 3, wherein
when a plurality of matrices are used as said quantization matrix, said conversion factor is calculated while the difference of said DC components is suppressed.

5. The encoder according to claim 1, wherein
said factor multiplier is configured to, for each frequency component block of the plurality of patterns of predictive coding processes, multiply each of said frequency components in said respective frequency component block by a weighting factor.

6. An image conversion apparatus, comprising:
a decoder; and
said encoder as defined in claim 1.

* * * * *